US012811217B2

(12) United States Patent
Bays et al.

(10) Patent No.: US 12,811,217 B2
(45) Date of Patent: Nov. 24, 2026

(54) LOW-CONDUCTIVITY COOLANT SYSTEM FOR AN ELECTRICAL SYSTEM

(71) Applicant: Cummins Inc., Columbus, IN (US)

(72) Inventors: Mark N. Bays, Columbus, IN (US); John Hoyle, Columbus, IN (US)

(73) Assignee: Cummins Inc., Columbus, IN (US)

( * ) Notice: Subject to any disclaimer, the term of this patent is extended or adjusted under 35 U.S.C. 154(b) by 677 days.

(21) Appl. No.: 18/225,391

(22) Filed: Jul. 24, 2023

(65) Prior Publication Data

US 2024/0039082 A1 Feb. 1, 2024

Related U.S. Application Data

(60) Provisional application No. 63/392,443, filed on Jul. 26, 2022.

(51) Int. Cl.

*H01M 10/6568* (2014.01)
*B01D 15/36* (2006.01)
*B01D 24/00* (2006.01)
*B01D 36/00* (2006.01)
*H01M 10/613* (2014.01)
*H01M 10/625* (2014.01)
*B60K 11/02* (2006.01)

(52) U.S. Cl.

CPC ...... *H01M 10/6568* (2015.04); *B01D 15/361* (2013.01); *B01D 24/00* (2013.01); *B01D 36/00* (2013.01); *H01M 10/613* (2015.04); *H01M 10/625* (2015.04); *B60K 11/02* (2013.01); *B60L 2210/40* (2013.01); *H01M 2220/20* (2013.01)

(58) Field of Classification Search

CPC ........... H01M 10/6568; H01M 10/613; H01M 10/625; H01M 2220/20; B60D 15/361; B60D 24/00; B60D 36/00; B60K 11/02; B60L 2210/40

USPC .......................................................... 429/120

See application file for complete search history.

(56) References Cited

U.S. PATENT DOCUMENTS 10,550,494 B2 * 2/2020 Savoy .................. B01J 19/0046
2008/0221248 A1 * 9/2008 Kim ....................... B01J 20/268 524/297
2022/0173415 A1 * 6/2022 Park .................... F16K 11/0873
2022/0231314 A1 * 7/2022 Choi ................. H01M 8/04358

FOREIGN PATENT DOCUMENTS

CN 114300710 A * 4/2022

* cited by examiner

*Primary Examiner* — James M Erwin

(74) *Attorney, Agent, or Firm* — Foley & Lardner LLP

(57) ABSTRACT

The present disclosure provides an electrical system for an electrical vehicle, comprising: at least one electrical component; a cooling loop including a low-conductivity coolant coupled to each of the at least one electrical component; and at least one filter in the cooling loop. The cooling loop is configured to flow or circulate the low-conductivity coolant through each of the at least one battery and/or electrical component and the at least one filter includes a polisher material.

20 Claims, 4 Drawing Sheets

LOW-CONDUCTIVITY COOLANT SYSTEM FOR AN ELECTRICAL SYSTEM

CROSS-REFERENCE TO RELATED APPLICATIONS

This application claims the benefit of U.S. Provisional Patent Application No. 63/392,443, filed Jul. 26, 2022, entitled "LOW-CONDUCTIVITY COOLANT SYSTEM FOR AN ELECTRICAL SYSTEM," which is incorporated herein by reference in its entirety.

FIELD

The present disclosure relates to systems for cooling electrical components in electrical systems, such as those used in electric vehicles.

BACKGROUND

Electrified systems generally operate using batteries to run electrical components within the system. These batteries are designed to operate at ambient temperatures. However, during charging and operation, the temperature of the batteries and other electrical components can be elevated.

Cooling systems are designed to control the temperature of the batteries and other electrical components of an electrified system to reduce the risk of overheating and stay within the various material limits of the electrical components. Coolants are commonly used to transfer the heat away from the electrical components and into a coolant.

Low-conductivity coolant can be used in high power density electrical equipment and electrified vehicle drive train components. If conductive coolant were to leak into electrical components, the conduction of the electricity could short-circuit the electrified system. However, low-conductivity coolant reduces the risk of causing a short-circuit in the components if the coolant comes in contact with the components (e.g., if the coolant leaks).

The coolant may pick up conductive ions from the surrounding environment while in use. These conductive ions increase the conductivity of the low-conductivity coolant. A polisher assembly may be used to remove these unwanted conductive ions.

There is a need for a cooling system in electrified systems that efficiently removes ions from low-conductivity coolant to prolong the lifetime of the low conductivity coolant without putting undue burden on the end user.

Advantages and features of the embodiments of this disclosure will become more apparent from the following detailed description of exemplary embodiments when viewed in conjunction with the accompanying drawings.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
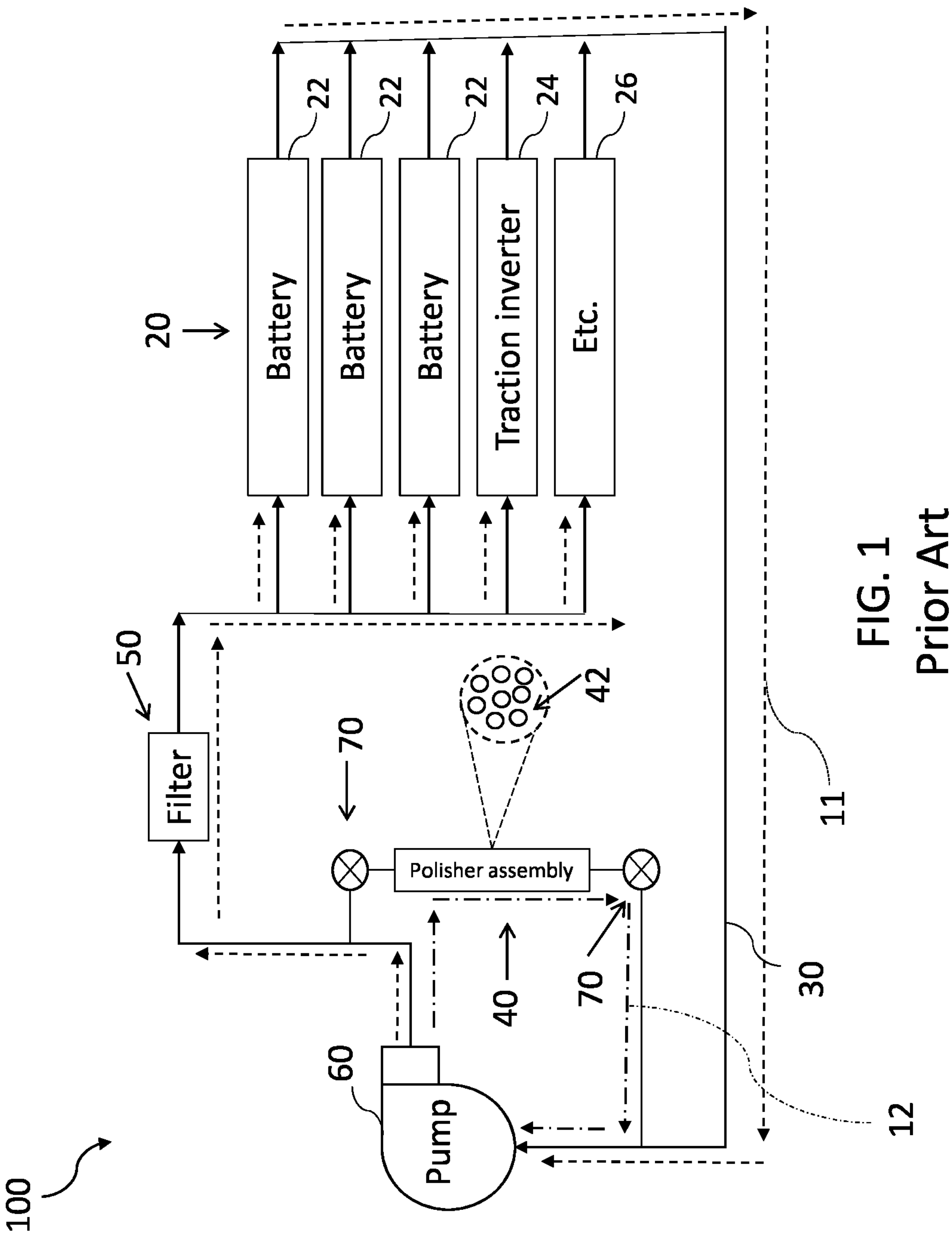
FIG. 1 Prior Art
FIG. 1 is a diagrammatic illustration of a prior art cooling system for an electrical system.

Although the drawings represent embodiments of the various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings. It is not beyond the scope of this disclosure to have a number (e.g., all) the features in a given embodiment to be used across all embodiments.

Electrical systems, such as for example those of electric vehicles, use electricity in place of or in addition to traditional fuel sources, such as diesel, gasoline, or fuel cells. In some embodiments, a battery supplies the electricity for the electrical system. The battery, or plurality of batteries, supply electricity to the electrical components of the system. These electrical components can be converters, traction inverters, and/or types of motors. While in use, the electrical components may heat up. Cooling systems may be used to maintain the temperature within the limits of the material.

Cooling systems for electrical systems may use coolant to lower the temperature of electrical components. Low-conductivity coolant may be used to reduce the likelihood that leaking coolant may conduct electricity from the electrical components. During the lifetime of low-conductivity coolant, the coolant may pick up ions from the system, increasing the conductivity of the coolant. A polisher assembly may be used in cooling systems to remove ions from the low-conductivity coolant. However, a polisher assembly may have a shorter lifetime than the lifetime of the electrical device and may need to be replaced. Along with the polisher assembly, there are filters and batteries of electrical systems that also have maintenance intervals that may or may not align with the maintenance interval of the polisher assembly. Known prior art cooling systems may include a filter and a polisher assembly coupled to electrical components with plumbing. The plumbing may include hoses, tubes or other structures to provide flow paths for the liquid or other fluid coolant. Valves may be used to control the flow of coolant through or bypassed around the filter or polisher assembly.

This known prior art cooling system may have some disadvantages. The valves and bypass plumbing add cost to the system. Typically, it's impractical to build a single polisher assembly of sufficient size to last the life of the product resulting in a maintenance point for the product that, at best, puts a burden on the end user, and, at worst, could be missed resulting in loss of low conductivity function. Therefore, known prior art cooling systems may have maintenance intervals for many components coupled to the cooling system. Removing a polisher assembly to replace it may cause the coolant retained in the polisher assembly and plumbing to spill during maintenance, creating a mess. Additionally, having a polisher assembly adds one more maintenance interval for the end user to keep track of on top of the different maintenance intervals for other components of the electrical system.

FIG. 1 shows a known prior art electrical system including a cooling system 100. There can be a plurality of electrical components 20 connected in a coolant flow path 11. A pump 60 circulates a coolant 30 through the coolant flow path 11 to a plurality of electrical components 20 (coupled in parallel coolant flow paths with respect to one another in the flow path 11) to reduce the temperature of electrical components 20.

Coolant flow paths 11 may be defined or formed by a series of tubing or other connecting hollow paths that supports the flow of coolant 30 through the electrical components 20. There are multiple pathways in cooling flow path 11 that coolant 30 can flow after being pumped by pump 60. A bypass flow path 12 allows coolant 30 to flow into a polisher assembly 40 (discussed in detail below) when valves 70 are open. When valves 70 are closed, coolant 30 circulates through cooling flow path 11 without passing through polisher assembly 40. Coolant flow paths 11 and 12 are separate from one another.

Electrical components 20 may include a plurality of batteries 22. Batteries 22 may supply power to the electrified apparatus that the cooling system batteries 22 are coupled to. Batteries 22 may also include one or more cells that employ any of various suitable energy storage technologies such as lithium-ion batteries.

In electrical systems, commonly a plurality of batteries are used to provide power to motors that achieve a function of the electrical apparatus containing the electrical system. The electrical system may include a traction inverter 24. Batteries 22 provide stored electricity to the traction inverter 24, which converts DC current into 3-phase AC current that one or more electric motors may use to power the electric apparatus.

Coolant 30, in some embodiments, may be a low-conductivity coolant. Low-conductivity coolants are poor conductors of electricity. Low-conductivity coolant reduces the risk that, in the event of a coolant leak, the coolant will cause a short circuit in the electrical system. However, during the lifetime of a coolant, the coolant may pick up material or contaminants such as ions from circulation through a cooling system. An increased number of ions or other materials may make the low-conductivity coolant more conductive. A polisher assembly 40 may be used to remove ions from the coolant to maintain the low-conductivity of the coolant.

Referring back to FIG. 1, polisher assembly 40 is coupled in the bypass flow path 12 and contains polishing material 42 to polish coolant 30 as coolant 30 flows through bypass flow path 12. Polishing material 42 may include ionically active polymer beads, the ionically active polymer beads configured to remove ions from a fluid. The lifetime of polishing material 42 may not be as long as the lifetime of the electrical apparatus such as components 20 in the cooling system 100. Replacement of polisher material 42 may be needed to continue removing ions from coolant 30 to ensure that undesired or excessive amounts of ions do not accumulate in coolant 30. Polisher assembly 40 may be serviced separately from filter 50 and electrical components 20 due to the separate couplings of the components (e.g., by the valves 70). Polisher assembly 40 is removably coupled in the cooling system 100 in embodiments.

The illustrated embodiments of cooling system 100 includes a filter 50. Filter 50 removes contaminants from the coolant 30 flowing through cooling flow paths 11. One embodiment of filter 50 may include a filter bed support and a filter bed. The filter bed may be made of a mesh or other permeable material that coolant 30 flows through but contaminants cannot flow through.

Known cooling systems 100 have disadvantages such as increased costs due to valves and plumbing for bypass flow path 12 and multiple separate maintenance intervals for filter 50, polisher assembly 40, and electrical components 20. The present disclosure offers cooling systems that provide an alternative to known cooling systems.

Figure 2:
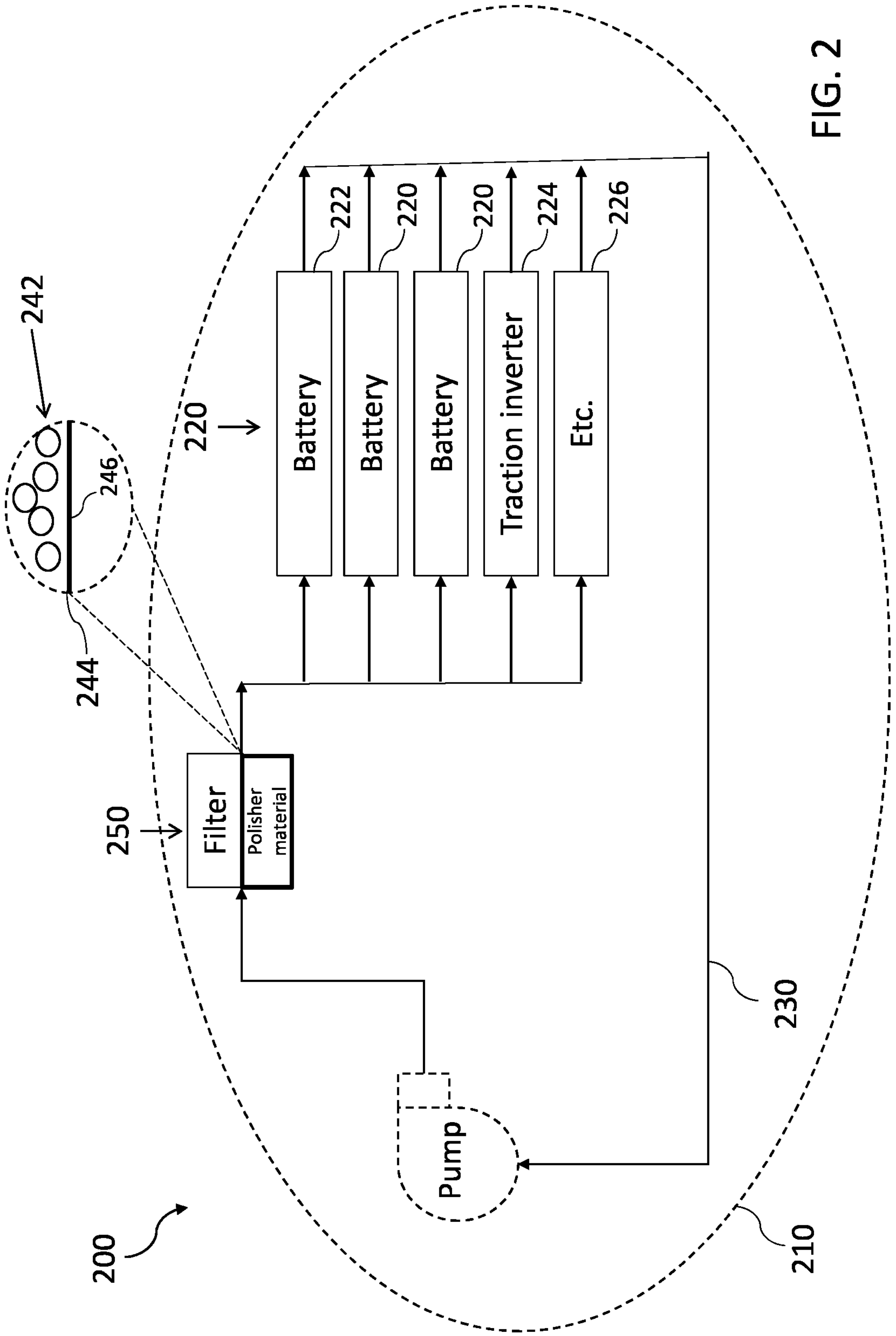
FIG. 2 is a diagrammatic illustration of an embodiment of a cooling system of the present disclosure for maintain low-conductivity coolant in an electrical system.

FIG. 2 depicts a cooling system 200 that includes a cooling loop 210, wherein a low-conductivity coolant 230 flows through cooling loop 210. A plurality of electric components 220 and a filter 250 are coupled to cooling loop 210 such that low-conductivity coolant 230 flows through cooling loop 210 into electric components 220 and filter 250.

Cooling loop 210 is a conduit or flow path that supports the flow of liquid through electrical components 220. Unlike cooling flow paths 11 in FIG. 1, cooling loop 210 is a continuous loop that may not have a bypass flow path. Coolant 230 flows through coolant loop 210 into each component coupled to coolant loop 210. Cooling loop 210 may not include any valves or a bypass flow paths, reducing the cost of components for cooling system 200.

Electrical components 220 may include at least one battery 222, a traction inverter 224, and/or other relevant electrical components 226 for the electrical apparatus that comprises cooling system 200. Cooling loop 210 is configured to circulate low-conductivity coolant 230 through each battery 222 coupled to cooling loop 210.

To reduce the temperature of electrical components 220 during operation while protecting against short-circuiting in the case of coolant leakage, low-conductivity coolant 230 is used in cooling system 200. The heat from electrical components 220 is transferred to low-conductivity coolant 230. As discussed above, low-conductivity coolant 230 may not conduct electricity well and, in the event of a leak of coolant, low-conductivity coolant 230 may not conduct the electricity running through electrical components 220.

To remove any particulates or other contaminants, filter 250 is optionally removably coupled to cooling loop 210. Embodiments of filter 250 contain a filter bed support 244 and a filter bed 246. Filter bed 246 may comprise of a mesh or other permeable material that allows low-conductivity coolant to flow through filter bed 246.

Over time, low-conductivity coolant 230 may pick up ions from the environment and become conductive. To remove stray ions, low-conductivity coolant 230 may be polished. Instead of having a separate polisher assembly, cooling system 200 comprises filter 50 that includes polisher material 242. Polisher material 242 comprises an ionically active polymer, the ionically active polymer is configured to remove ions from a fluid. The ionically active polymer may be a polymer bead. Polisher material 242 may be within filter 250, supported by filter bed 246. As low-conductivity coolant 230 flows through filter bed 246, low-conductivity coolant is polished by polisher material 242 before circulating through electrical components 220. The low-conductivity coolant is effectively continuously polished while flowing through the cooling loop 210.

Still referring to cooling system 200 of FIG. 2, filter 250 and polisher material 242 may be configured to have a same or similar service life. Service specifications for cooling system 200 may specify replacement of filter 250 and polisher material 242 at about the same time. By simultaneously servicing filter 250 and polisher material 242, the burden on the end user may be reduced due to reduction of one maintenance interval compared to known systems exemplified in FIG. 1.

Figure 3:
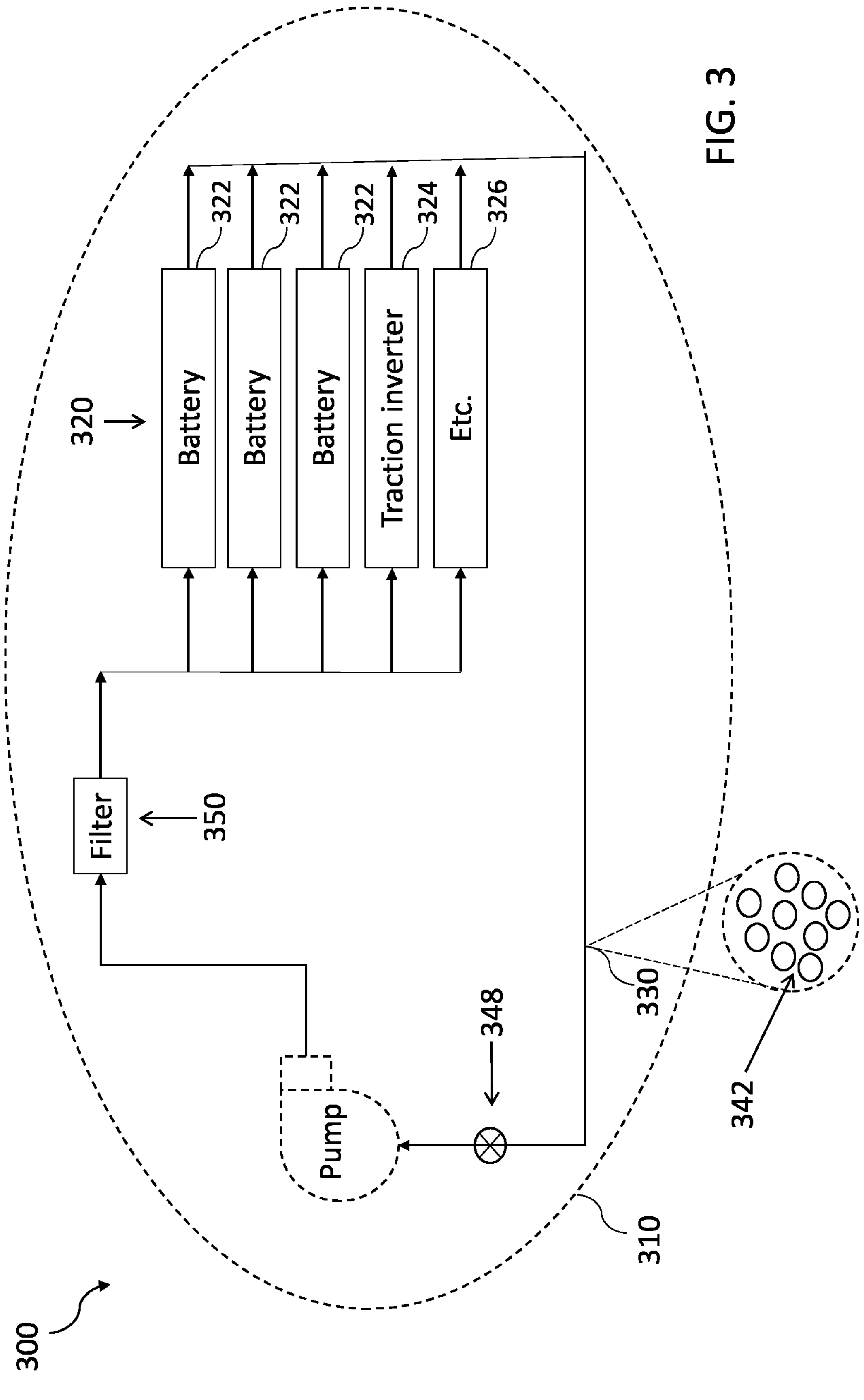
FIG. 3 is a diagrammatic illustration of an embodiment of a cooling system of the present disclosure for maintain low-conductivity coolant in an electrical system.

FIG. 3 depicts a cooling system 300 that includes a cooling loop 310. A plurality of electrical components 320 and a filter 350 are (optionally) removably coupled to cooling loop 310 such that a low-conductivity coolant 330 that flows through cooling loop 310 into electric components 320 and filter 350.

Cooling loop 310 is similar to cooling loop 210. As low-conductivity coolant 330 flows through cooling loop 310, it passes through all components coupled to cooling loop 310. In the illustrated embodiments, there are no bypass flow paths in cooling loop 310, as there are in cooling system 100.

Electrical components 320 may include at least one battery 322, a traction inverter 324, and/or other relevant electrical components 326 for the electrical apparatus that comprises cooling system 300. Cooling loop 310 is configured to circulate low-conductivity coolant 330 through each battery 322 coupled to cooling loop 310.

In some embodiments, filter 350 is removably coupled to cooling loop 310. Filter 350 may include a filter bed support and a filter bed, the filter bed comprising of a mesh or other permeable material. In some embodiments, filter 350 may be a filter known in the art. Filter 350 may be configured to remove particulates and other impurities from low-conductivity coolant 330. In other embodiments, cooling system 300 may not include a filter.

Cooling system 300 is used to reduce the temperature of electrical components 320 by transferring the heat from electrical components 320 to low-conductivity coolant 330. Low-conductivity coolant 330 is similar to low-conductivity coolant 230 in that low-conductivity coolant 330 is a poor conductor of electricity. To maintain the low-conductivity of low-conductivity coolant 330, a polisher material 342 may be directly added into low-conductivity coolant 330.

Polisher material 342 comprises an ionically active polymer configured to remove ions from low-conductivity coolant 330. The ionically active polymer of polisher material 342 may comprise polymer beads. Polisher material 342 may be sized and shaped to pass through filter 350 so as to circulate throughout the entirety of cooling loop 310. The size of polisher material 342 used in an embodiment of cooling system 300 that includes filter 350 may be from 200 microns, 225 microns, 250 microns, or 275 microns, 300 microns, 325 microns, or within any range using any two of the foregoing as end points.

In one embodiment, an amount of polisher material 342 is added into low-conductivity coolant 330 such that the lifetime of polisher material 342 may be the same as the electric apparatus that includes cooling system 300. In this embodiment, there may be no maintenance interval for polisher material 342.

In another embodiment, the lifetime of the amount of polisher material 342 within low-conductivity coolant may be shorter than the lifetime of the electrical apparatus that contains cooling system 300. However, instead of replacing a polisher assembly at the end of the lifetime of polisher material 342, more polisher material 342 may be added into cooling loop 310 through an access port 348. Access port 348 may be opened such that polisher material 342 may be inserted directly into the flow path of cooling loop 310 without removing any coupled components. By including polisher material 342 within coolant 330, there is no polisher assembly to remove from cooling loop 310, avoiding a mess and spilling of low-conductivity coolant 330.

Figure 4:
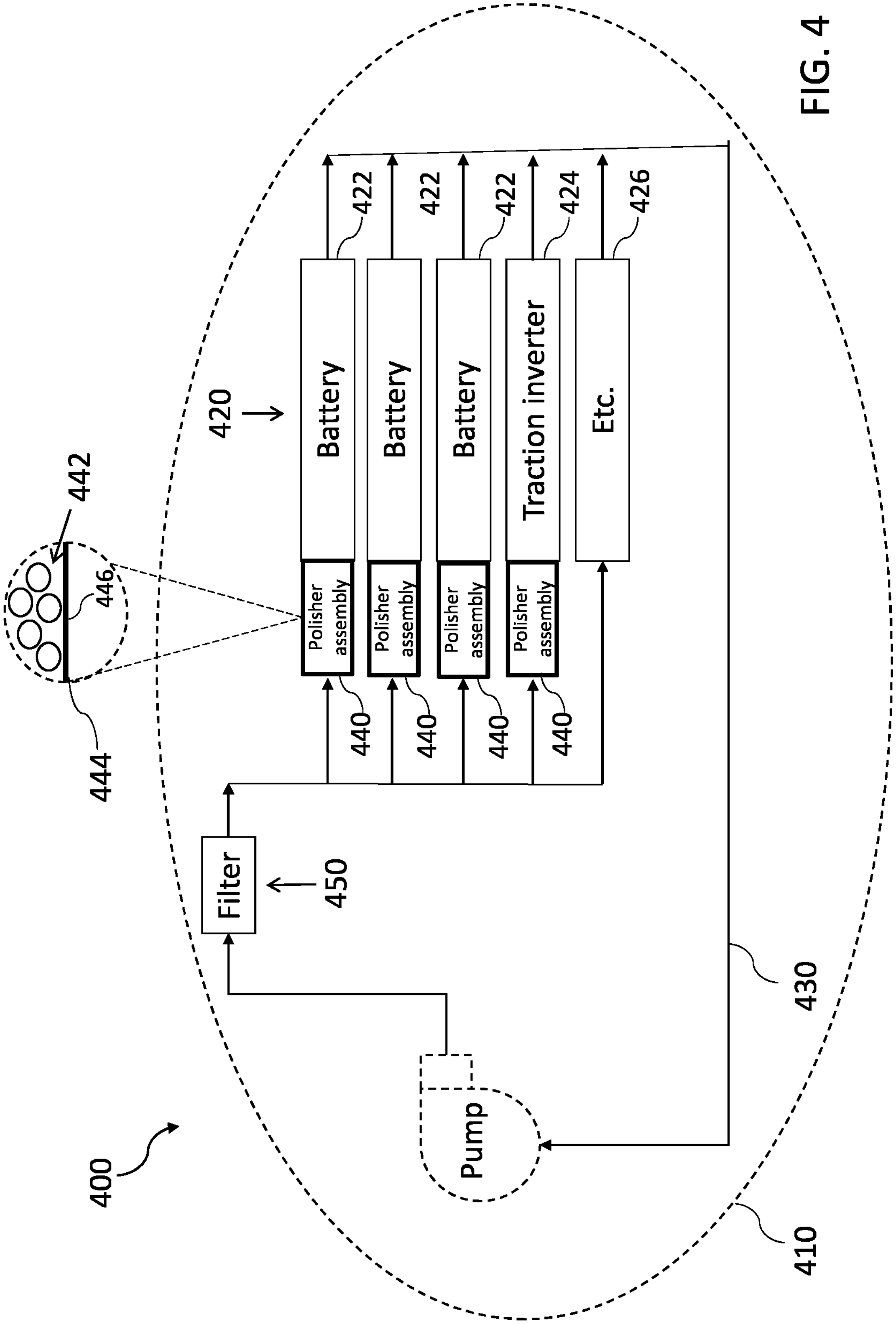
FIG. 4 is a diagrammatic illustration of an embodiment of a cooling system of the present disclosure for maintain low-conductivity coolant in an electrical system.

FIG. 4 depicts a cooling system 400 that includes a cooling loop 410. A plurality of electrical components 420 and a filter 450 are removably coupled to cooling loop 410 such that a low-conductivity coolant 430 that flows through cooling loop 410 into electric components 420 and filter 450.

Cooling loop 410 is similar to cooling loops 210 and 310. As low-conductivity coolant 430 flows through cooling loop 410, it passes through all components coupled to cooling loop 410. There are no bypass flow paths in cooling loop 410, as there are in cooling system 100, in the embodiments shown in FIG. 4.

Electrical components 420 may include a plurality of batteries 422, a traction inverter 424, and other relevant electrical components 426 for the electrical apparatus that comprises cooling system 400. Cooling loop 410 is configured to circulate low-conductivity coolant 430 through each battery in the plurality of batteries 422 coupled to cooling loop 410. In one embodiment, batteries 422 are coupled in a parallel coolant flow path in cooling loop 410.

In some embodiments, filter 450 may be removably coupled to cooling loop 410. Filter 450 may include a filter bed support and a filter bed, the filter bed comprising of a mesh or other permeable material. In other embodiments, filter 450 may be a filter known in the art. Filter 450 may be configured to remove particulates and other impurities from low-conductivity coolant 430.

Cooling system 400 is used to reduce the temperature of electrical components 420 by transferring the heat from electrical components 420 to low-conductivity coolant 430. Low-conductivity coolant 430 is similar to low-conductivity coolants 230 and 330 in that low-conductivity coolant 330 is a poor conductor of electricity. To maintain the low-conductivity of low-conductivity coolant 430 in cooling system 400, a polisher assembly 440 may be integrally coupled to each of one or more batteries in the plurality of batteries 422. Each polisher assembly 440 may be coupled in a series coolant flow path with one of the plurality of batteries 422.

Polisher assembly 440 may include a polisher bed support 444 and a polisher bed 446. Polisher bed 446 may be made of a mesh or other permeable material that allows low-conductivity coolant 430 to flow through polisher bed 446. In one embodiment, polisher bed comprises a polisher material 442. Polisher assembly 440 may be configured such that as low-conductivity coolant 430 flows through polisher bed 446, low-conductivity coolant 430 is polished by polisher material 442. Polisher material 442 comprises an ionically active polymer configured to remove ions from low-conductivity coolant 430. The ionically active polymer of polisher material 442 may comprise of polymer beads.

Due to the integral coupling of each polisher assembly 440 to each battery 422 (e.g., they may be formed or incorporated into a common enclosure), polisher assembly 440 and battery 422 may be serviced at the same time, reducing the number of maintenance intervals for a system using cooling system 400. In one embodiment, polisher assembly 440 may have the same lifespan as battery 422 polisher assembly 440 is coupled to, reducing the amount of service needed for cooling loop 410. In another embodiment, the service specifications for the electrified system that uses cooling system 400 may specify replacement of battery 422 and a coupled polisher assembly 440 at about the same time.

It is well understood the connecting lines shown in the various figures contained herein are intended to represent exemplary functional relationships and/or physical couplings between the various elements. It should be noted that many alternative or additional functional relationships or physical connections can be present in a practical system. However, the benefits, advantages, solutions to problems, and any elements that can cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone can be present in an embodiment, B alone can be present in an embodiment, C alone can be present in an embodiment, or that any combination of the elements A, B or C can be present in a single embodiment; for example, A and B, A and C, B and C, or A and B and C.

In the detailed description herein, references to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. An electrical system for an electric vehicle, comprising:

at least one electrical component;

a cooling loop including:

a pump; and a low-conductivity coolant coupled to each of the at least one electrical component, wherein the pump is configured to flow or circulate the low-conductivity coolant through each of the at least electrical component; and at least one filter in the cooling loop, the at least one filter positioned upstream of the at least one electrical component in the cooling loop such that the low-conductivity coolant flows from the at least one filter to the at least one electrical component without passing through the pump;

wherein the at least one filter includes a polisher material.

2. The electrical system of claim 1, wherein:

the at least one filter is positioned in the cooling loop and configured to continuously polish the low-conductivity coolant circulating through the at least one electrical component during operation of the electric vehicle; and the cooling loop is free of any bypass flow path and flow redirecting valves.

3. The electrical system of claim 1, wherein the at least one filter is removably coupled in the cooling loop so as to be replaceable.

4. The electrical system of claim 1, wherein each of the at least one filter and the polisher material within the at least one filter is configured to have a same or similar service life, and wherein optionally service specifications for the electrical system specifies replacement of the at least one filter and the polisher material at about a same time.

5. The electrical system of claim 1, wherein the polisher material comprises an ionically active polymer bead, the ionically active polymer bead configured to remove ions from a fluid.

6. The electrical system of claim 1, wherein the at least one filter comprises:

a filter bed support; and a filter bed supported by the filter bed support, the filter bed including a permeable material that is configured to remove contaminants from the low-conductivity coolant separately from the polisher material;

wherein the filter bed contains the polisher material such that as fluid flows through the filter bed, the fluid is polished by the polisher material.

7. An electric vehicle including the electrical system of claim 1, optionally including one or more traction inverters electrically coupled to the at least one electrical component.

8. A cooling system for an electrified vehicle, the cooling system comprising:

a cooling loop connected to at least one electrical component; and a low-conductivity coolant that flows through the cooling loop;

wherein a polisher material is mixed into the low-conductivity coolant and flows with the low-conductivity coolant.

9. The cooling system of claim 8, wherein the polisher material comprises an ionically active polymer, the ionically active polymer configured to remove ions from a fluid.

10. The cooling system of claim 8, wherein more polisher material is added into the low-conductivity coolant at an end of a lifespan of the polisher material in the low-conductivity coolant.

11. The cooling system of claim 8, further comprising a filter removably coupled to the cooling loop.

12. The cooling system of claim 11, wherein the polisher material is a polymer sized and shaped to pass through the filter, the polymer comprises ionically active material configured to remove ions from the low-conductivity coolant.

13. An electrified system, the electrified system comprising:

a plurality of electrical components;

a cooling loop connected to each of the electrical components in the plurality of electrical components;

wherein a low-conductivity coolant flows through the cooling loop; and a polisher assembly integrally coupled to each of the electrical components in the plurality of electrical components.

14. The electrified system of claim 13, wherein the plurality of electrical components comprises one or more batteries.

15. The electrified system of claim 13, wherein the polisher assembly is a first polisher assembly of a plurality of polisher assemblies, each polisher assembly in the plurality of polisher assemblies comprising:

a polisher bed support; and a polisher bed supported by the polisher bed support;

wherein the polisher bed contains a polisher material.

16. The electrified system of claim 15, wherein the polisher material comprises an ionically active polymer configured to remove ions from a fluid.

17. The electrified system of claim 16, wherein the cooling loop is free of a bypass polisher assembly through which the low-conductivity coolant can flow or circulate in a loop without flowing through the polisher assembly.

18. The electrified system of claim 15, wherein each polisher assembly in the plurality of polisher assemblies has a same lifespan as an electrical component in the plurality of electrical components the polisher assembly in the plurality of polisher assemblies is coupled to.

19. The electrified system of claim 15, wherein optionally service specifications for the electrified system specify replacement of an electrical component in the plurality of electrical components and a coupled polisher assembly in the plurality of polisher assemblies at about a same time.

20. The electrified system of claim 15, further comprising a filter removably coupled to the cooling loop.

* * * * *